Jan. 30, 1962  J. R. GOERKE  3,018,763

SERVO CONTROL APPARATUS

Filed April 20, 1960

INVENTOR.
JAMES R. GOERKE
BY
William Thompson
AGENT

# United States Patent Office 3,018,763
Patented Jan. 30, 1962

3,018,763
SERVO CONTROL APPARATUS
James R. Goerke, South Bend, Ind., assignor to The
Bendix Corporation, a corporation of Delaware
Filed Apr. 20, 1960, Ser. No. 23,522
10 Claims. (Cl. 121—41)

This invention relates to servo mechanisms and more particularly to apparatus for converting a small force input signal into a useful position output signal.

The servo mechanism of the present invention belongs to the class of servo mechanisms comprised of a movable input lever, a hydraulic servo motor controlled by the input lever, and feedback means for applying a balancing variable force-moment to the input lever by moving a fulcrum or point of application of a substantially constant feedback force. Such a servo mechanism has the advantage of being capable of producing an exceptionally linear input signal to output travel relationships and has a high degree of accuracy and reliability. In copending application Serial No. 749,679, filed July 21, 1958 in the name of Howard L. McCombs having a common assignee, a servo mechanism of the type described above and producing the advantages enumerated is disclosed. The present invention is an improvement over known servo mechanism of the class described by the inclusion of a table member or movable platform having an inclined track in the feedback loop to form the variable fulcrum. The use of a movable platform such as will be described, has the advantage of permitting a stroke reduction or amplification between the movement of the output member and movement of the fulcrum. Further, the necessity to maintain assembled parts in a close tolerance relationship as in the device disclosed in application Serial No. 749,679 and other prior art devices is to a large degree avoided, thus providing a device that may be more economically manufactured and assembled. Still further, the present device lends itself exceptionally well to use in systems requiring a large output stroke since the necessity of providing a large surface area on the input lever for the movable fulcrum to traverse is avoided. Accordingly, it is an object of the present invention to provide an improved servo mechanism device having feedback means for producing the aforementioned advantages.

Other objects and advantages will become apparent to those skilled in the art in view of the following description taken in conjunction with the drawings wherein.

Figure 1:
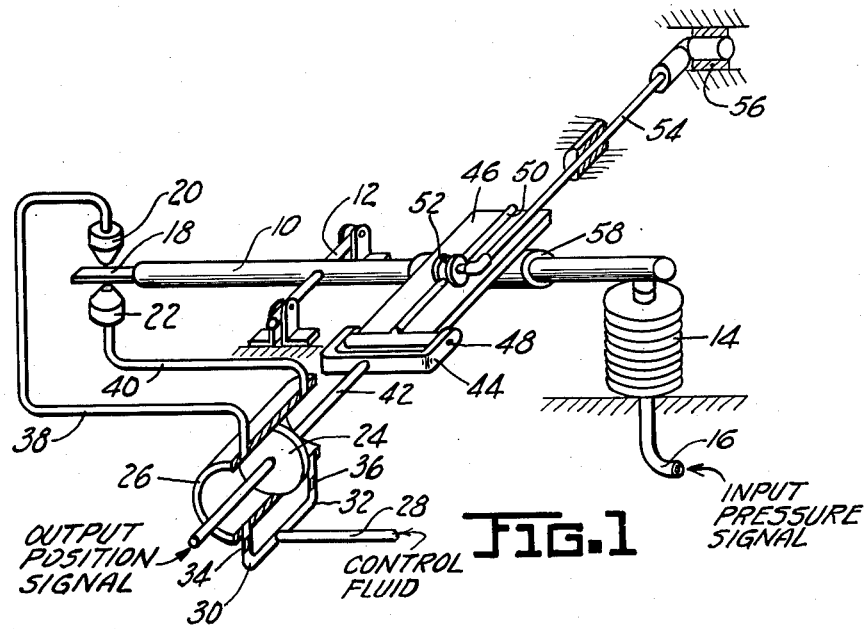
FIGURE 1 is an isometric drawing showing a preferred embodiment of my improved servo mechanism and including a movable table in the feedback loop.

Referring to FIGURE 1, the numeral 10 represents a movable input lever or balance beam which is pivotally supported by fixed pivot shaft 12. An input force is applied to the right end of beam 10 by bellows 14 which has a conduit 16 for receiving a pressurized input signal such as from a variable pressure air source or the like. It should be understood that the bellows 14 is illustrated merely to show one possible means of applying a force input to lever 10, and it is within the teachings of the present invention to utilize any means known in the art for accomplishing this object. At the left end of beam 12 is a projection 18 which is disposed closely adjacent a pair of servo pilot valves or ports 20 and 22 to control the relative rate of flow of fluid from said pilot valves. A hydraulic motor or piston 24 is movable along an axis perpendicular to the longitudinal axis of beam 10 and is contained in cylindrical sleeve member 26, only a half of which has been illustrated with end plates removed so as not to obscure piston 24. Pressurized control fluid from a source, not shown, is supplied to conduit 28 and is transmitted through branch conduits 30 and 32, each containing a restrictive bleed or orifice member 34 and 36 respectively, and from there to sleeve 26 at opposite sides of piston 24. Fluid conduits 38 and 40 interconnect opposite ends of cylinder 26 to servo pilot valves 20 and 22 respectively to provide for a continuous flow of control fluid away from cylinder 26 through said pilot valves. Projection 18, pilot valves 20 and 22, cylinder 26, piston 24, and the interconnecting conduits comprise a suitable hydraulic servo device of the double acting type which may be employed in the practice of the present invention. When projection 18 is midway between pilot valves 20 and 22 an equal rate of control fluid will leak from each of said pilot valves causing the fluid pressures acting on opposite sides of piston 24 to be equal and balanced out so that piston 24 remains stationary or in a "null" position. If projection 18 is advanced towards one of the pilot valves and away from the other, fluid leakage will be restricted through one valve and increased through the other, thus creating a pressure differential across piston 24 which causes said piston to move in a direction corresponding to the direction of movement of projection 18 from its mid position. It should be understood that other forms of conventional servo motors may be used in place of the double acting system described above. Specifically it is within the scope of the present invention to employ a single acting servo motor in systems where response requirements may not be critical such as that employed to position a governor valve in copending application Serial No. 682,570, filed September 5, 1957 in the name of Andrew Kuzmitz and having a common assignee.

Integrally formed through the center of piston 24 is a rod member 42, the left end or end extending outwardly from the plane of the paper of which is adaptable to positioning any output device desired. The right end or other end of rod 42 is secured to a yoke 44 in a rigid manner. A movable table or platform member 46 is pinned to yoke 44 at 48 such that platform 46 will follow the axial movement of piston 24. A guide track 50, illustrated in a form of a raised longitudinally extending projection, is formed on the upper surface of platform 46 and mates with a grooved rotating wheel or pulley 52. Wheel 52 is in turn supported by a projection extending from torsion member 54 which is prestressed and held in position by means of fixed retainer 56 and sleeve 58 which maintains axial alignment but which however permits the relative rotation of said torsion member. Torsion member 54 urges wheel 52 downwardly into contactive engagement with guide track 50 of the movable platform 46 by applying a substantially constant force along the axial center of wheel 52. The constant force derived from torsion member 54 and transmitted through wheel 52, guide track 50 and platform 46 is further operative to urge platform 46 into contactive engagement with beam 10 on the underneath side in a manner to be presently described so that ultimately the constant force is applied to beam 10 producing a moment tending to rotate said beam clockwise or in a direction in opposition to that produced by the input force means 14. It is pointed out that torsion member 54 may be readily located in a position adjacent and parallel to cylinder 26 (rotated 180° about wheel 52) to provide a more compact package or overall envelope size needed to house my servo mechanism. Further, if desired torsion member 54 may be replaced by a spring or other force producing means capable of applying a substantially constant force to wheel 52, however, I have found the torsion member to be exceedingly reliable, capable of more accurate calibration, relatively free from hysteresis, and adds little to overall package size when located adjacent cylinder 26 compared to other known force producing means.

Figure 2:
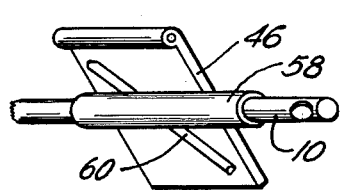
FIGURE 2 is a partial isometric view of the present invention showing particularly the movable platform and inclined track formed thereon as viewed from the underneath side from the mechanism shown in FIGURE 1.

The beam 10 has an enlarged diametered portion 58 formed thereon which contacts the underneath side of platform 46, see FIGURE 2, which has an inclined track 60 formed thereon. The point of contact between inclined track or projection 60 and enlarged portion 58 of beam 10 determines the point at which the constant force derived from torsion member 54 is applied to beam 10. As platform 46 is moved, the distance from the point of force application to pivot shaft 12 (FIGURE 1) is varied thus causing the feedback moment to vary.

Figure 3:
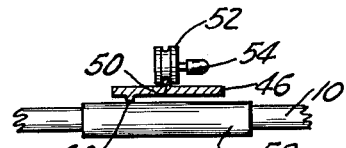
FIGURE 3 is a sectional view of a portion of the servo mechanism of FIGURE 1 showing particularly the cross-sectional configuration of a preferred form of my movable platform.

In FIGURE 3 a cross section of table 46 more clearly illustrates the manner in which force is transmitted from wheel 52 through projection 50, platform 46, portion 58 to beam 10. If desired, track 50 may be made in the form of a depression rather than a projection on table 46 with a mating surface formed on the circumference of wheel 52.

Figure 4:
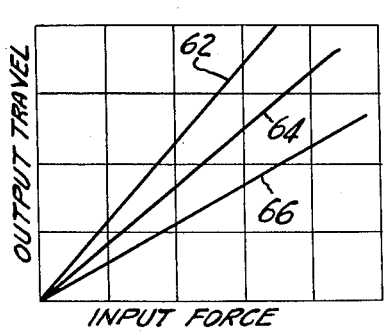
FIGURE 4 is a graph showing linear input to output relationships which the servo mechanism is capable of performing.
Figure 5:
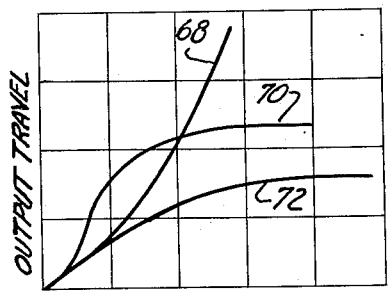
FIGURE 5 is a second graph showing some of the non-linear relationships the servo mechanism may perform with a slight modification of the inclined track.

FIGURES 4 and 5 illustrate some of the operating characteristics that may be achieved by my servo mechanism wherein the abscissa of said graphs represents the input force applied to beam 10 by means 14 and the ordinate represents the output travel of the rod 24 corresponding to the input force. The variation between curves 62, 64 and 66 of FIGURE 4 graph may be achieved by the simple expedient of varying the inclination of track 60, whereas if a compound curve is formed by track 60, non-linear characteristics such as those portrayed by curves 68, 70 and 72 of FIGURE 5 may be achieved.

*Operation*

The operation of my device may be best understood by a consideration of its operation in response to a change in force applied by input means 14. Assuming the moments acting on beam 10 are in balance and then the pressure supplied to bellows 14 is increased, beam 10 will rotate counterclockwise restricting the flow of fluid from pilot valve 22 and simultaneously permitting more fluid to flow from valve 20 thus creating a pressure differential across piston 24 that will move said piston to the left or outwardly from the plane of the paper. Movement of piston 24 is transmitted to movable platform 46 and drags it over the surface of beam 10 increasing the distance of the point of contact of inclined track 60 and beam 10 from pivot shaft 12 thus increasing the feedback moment on beam 10 which causes said beam to be restored to its initial balanced condition. Should the force supplied by means 14 assume its original lower value, substantially the reverse operation will occur with beam 10 rotating clockwise, piston 24 moving into the plane of the paper and the moment arm of the constant feedback force being reduced until a balanced condition is achieved.

It will be apparent to those skilled in the art that various modifications and changes in the form and relative arrangement of parts may be made other than those specifically suggested here in without departing from the scope and spirit of the present invention.

I claim:

1. In a servo mechanism the combination of a movable beam having a fixed pivotable support intermediate to the ends thereof, means for applying a variable input force to said movable beam at a point a substantially fixed distance from said fixed pivotable support, a hydraulic servo motor having a pilot control valve controlled by said movable beam, a movable platform having an inclined track formed thereon connected to said servo motor and movable in position therewith, a substantially constant force producing means operative to urge said movable platform into contactive sliding engagement with said movable beam along said inclined track.

2. In a servo mechanism as claimed in claim 1 wherein said substantially constant force producing means is comprised of a torsion member and a rotating wheel bearing against said movable platform.

3. In a servo mechanism as claimed in claim 2 wherein said movable platform has a guide track formed thereon which cooperates with the circumferential surface of said rotating wheel to guide said platform along one axis of movement.

4. In a servo mechanism the combination of a servo motor, means operative to control the movement of said servo motor in response to a position input signal, a balance beam operative with said last named means to supply the position input signal therefor as a function of the movement of said beam, means for applying a variable input force to said balance beam tending to urge said beam to move, and feedback force means comprised of a substantially contsant force producing member and a movable table having a raised projection formed thereon for applying a feedback force to said balance beam in opposition to said variable input force, said movable table being urged into contact with said beam by said force producing member and being connected to said servo motor for movement therewith.

5. In a servo mechanism the combination of a servo motor, lever means operative to control said servo motor as a function of the combined forces acting thereon, means for applying a variable input force to said lever, a force producing member, a movable table urged into contactive engagement with said lever means by said force producing member, said table having a track formed thereon acting as a variable fulcrum point between said table and said lever means, means interconnecting said servo motor and said table to position said table member and vary said fulcrum point in response to movement of said servo motor.

6. In a servo mechanism the combination of a pivoted balance beam member having a longitudinally extending axis, a servo motor operative with said beam member and controlled thereby such that said servo motor is positioned in response to the pivoting of said beam member, said servo motor located in spacial relation to said beam member so that said servo motor moves along an axis substantially perpendicular to the longitudinally extending axis of said beam member, means for applying a variable input force to said lever, a movable platform having an inclined track traversing substantially the entire length and connected to said servo motor for movement along the axis of movement of said servo motor, and a substantially constant force producing member for applying a force to said movable platform and urging said inclined track into contactive engagement with said balance beam member.

7. In a servo mechanism as claimed in claim 6 wherein said inclined track has a constant angle of inclination throughout its length to provide a linear relationship between an input force variation and the movement of said servo motor.

8. In a servo mechanism as claimed in claim 6 wherein said inclined track has a varying angle of inclination throughout its length to provide a non-linear relationship between an input force variation and the movement of said servo motor.

9. In a servo mechanism as claimed in claim 6 wherein the connection between said servo motor and said movable platform is a pivoted connection and including means comprised of a guide track formed on the movable platform for guiding the movement thereof.

10. In a servo mechanism the combination of servo means, control means for controlling the movement of said servo means, and feedback means including a movable platform having a flat surface and a raised track projection formed on said surface connected to the last two named means for transmitting a moment to said control means that varies in response to the movement of said servo means.

References Cited in the file of this patent

UNITED STATES PATENTS

| | | |
|---|---|---|
| 2,610,614 | Sedquick | Sept. 16, 1952 |
| 2,643,055 | Sorteberg | June 23, 1953 |
| 2,824,548 | Roche et al. | Feb. 25, 1958 |
| 2,971,336 | Mock | Feb. 14, 1961 |